Nov. 10, 1925.
H. K. SELS ET AL
1,561,284
REGULATOR SYSTEM
Filed April 18, 1922
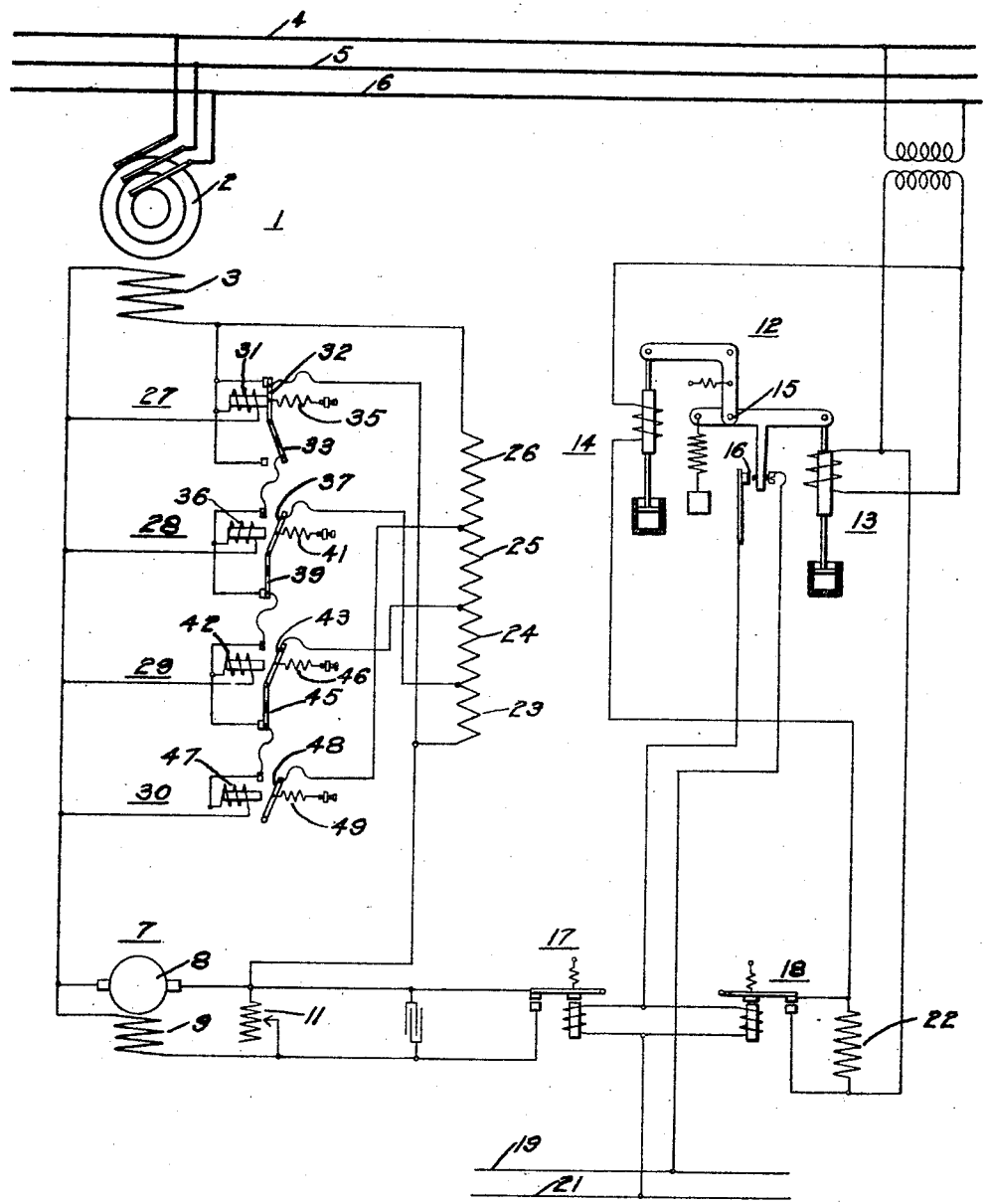
WITNESSES:
C. N. Cochran
P. J. Fitzgerald
INVENTORS
Hollis K. Sels and
Theodore Simmons
BY
Wesley G. Carr
ATTORNEY Patented Nov. 10, 1925.

1,561,284

UNITED STATES PATENT OFFICE.

HOLLIS K. SELS, OF PITTSBURGH, AND THEODORE SIMMONS, OF HOMEWOOD, PENNSYLVANIA, ASSIGNORS TO WESTINGHOUSE ELECTRIC & MANUFACTURING COMPANY, A CORPORATION OF PENNSYLVANIA.

REGULATOR SYSTEM.

Application filed April 18, 1922. Serial No. 555,356.

*To all whom it may concern:*

Be it known that we, HOLLIS K. SELS, a citizen of the United States, and a resident of Pittsburgh, in the county of Allegheny and State of Pennsylvania, and THEODORE SIMMONS, a citizen of the United States, and a resident of Homewood, in the county of Allegheny and State of Pennsylvania, have invented a new and useful Improvement in Regulator Systems, of which the following is a specification.

Our invention relates to electric regulator systems and it has special relation to systems for maintaining substantially constant voltage conditions upon a power circuit.

One object of our invention is to provide a regulator system that shall be quickly responsive to correct for variations in a characteristic of a power circuit, and that shall be operative over a range of voltage that is limited only by the capacity of the machines connected to the system.

Another object of our invention is to provide means whereby the exciter may operate above the residual magnetism thereof while the voltage across the field-magnet winding of the main dynamo-electric machine has a value lower than the voltage of the exciter.

More specifically, our invention relates to an alternating-current system embodying a synchronous condenser that is excited by means of an auxiliary generator. A vibrating contact regulator is provided for adjusting the voltage of the exciter generator in accordance with the line voltage, within the limits of stable operation of the exciter.

At times during the operation of the synchronous condensers, it becomes desirable to lower the excitation of the condenser field-magnet winding below the residual magnetism of the exciter. Various methods have been heretofore suggested whereby the operation of the synchronous condenser may be effectively regulated when receiving this low excitation.

The system of the present invention accomplishes the under-excitation of the condenser field-magnet winding by inserting in circuit therewith a plurality of impedance devices, such as sections of a resistor, and controlling the individual sections of said resistor by means of a plurality of electromagnetic switches. The windings of the switches receive the excitation voltage, and are adapted to have different settings.

One of the electromagnetic switches may be a master switch that operates as the voltage approaches the residual magnetism of the exciter and controls the circuits to the remaining switches. Upon the operation of one of the switches, a section of the resistor is inserted in the excitation circuit, so that the exciter is permitted to build up above the residual magnetism thereof and yet the effective excitation of the condenser field-magnet winding is below the residual magnetism of the exciter. The circuit to the coil of each electromagnetic switch is controlled by means of an interlock on the preceding switch, so that no one of the switches is energized prior to the time that it should become effective.

Our invention will best be understood by reference to the accompanying drawing, the single figure of which is a diagrammatic illustration of a system and apparatus embodying our invention.

A synchronous condenser 1, comprising an armature 2 and a field-magnet winding 3, is connected to a transmission line or power circuit comprising conductors 4, 5 and 6. The condenser field-magnet winding 3 is adapted to be energized from an exciter 7, comprising an armature 8 and a field-magnet winding 9. The field-magnet winding 9 has a variable resistor 11 in circuit therewith.

The operation of the synchronous condenser is controlled by means of a vibratory regulator 12, which may be of the well-known Tirrill type, comprising a control electromagnet 13, an anti-hunting electromagnet 14 and a lever system 15 for governing the operation of a pair of contact members 16. The contact members 16 are located in the energizing circuit for a plurality of relays 17 and 18. These relays are energized from control bus bars 19 and 21 which are connected to an independent source of power (not shown). The relay 17 controls a shunt circuit for the resistor 11 which is in circuit with the field-magnet winding 9 of the exciter. The relay 18 controls a shunt circuit for a resistor 22 that is in circuit with the anti-hunting electromagnet 14. As heretofore explained, the vibratory regulator 12 will normally function to control the operation of the synchronous condenser over the range of stable operation of the exciter, which is approximately between the residual voltage thereof and the maximum voltage for which it may be designed.

In order that the synchronous condenser may receive an excitation below the residual magnetism of the exciter, we provide a plurality of resistor sections 23, 24, 25 and 26 in the circuit of the field-magnet winding 3. The sections of the resistor are respectively controlled by electromagnetic switches 27, 28, 29 and 30.

Electromagnetic switch 27 comprises an energizing winding 31 that is connected directly across the excitation circuit. The winding 31 controls the operation of a switch arm 32 and an interlock switch member 33. A spring 35 is provided for operating the switch in one direction.

The switch 28 comprises an energizing winding 36, the circuit of which extends through the interlock 33 of the electromagnetic switch 27. Winding 36 controls the operation of a switch arm 37 and an interlock 39. A spring 41 is provided for operating the switch 28 in one direction. The switch 29 comprises an energizing winding 42, the circuit of which is completed through the interlock 39 of switch 28. The winding 42 controls a switch arm 43 and an interlock 45. A spring 46 is provided for operating the switch 29 in one direction. Electromagnetic switch 30 comprises an energizing winding 47, the circuit of which is completed through the interlock 45 of switch 29. The winding 47 controls a switch arm 48. A spring 49 is provided for operating the switch 30 in one direction.

Under normal conditions, the vibratory regulator controls the operation of the system until the exciter voltage has reached substantially its lower limit, which is the point at which the residual magnetism of the exciter prevents further decrease in voltage thereof. Prior to the obtaining of this condition, the spring 35 will overcome the pull of the winding 31 of the switch 27. This operation will close the circuit through the interlock 33 and also open the circuit through the switch arm 32. The closing of the circuit through the interlock 33 completes the energizing circuit for the winding 36 of switch 28, thereby moving the switch arm 37 to complete the circuit therethrough. Upon operation of the switch 28, the excitation circuit extends through the interlock 33 of switch 27, arm 37 of switch 28 and resistor section 23.

The insertion of the resistance 23 in circuit permits the exciter to build up above the lower limit of stable operation, but the effective voltage across the condenser field-magnet winding is below the voltage delivered by the exciter, the difference between the exciter voltage and the condenser field-magnet winding voltage being the ohmic drop across the resistor section 23. Since the exciter is now operating above residual voltage, the vibratory regulator may continue to properly control the operation of the synchronous condenser 1. The switch 27 becomes a master switch in its operation, since the winding 31 thereof is connected across the excitation circuit, and the circuit to each succeeding switch is governed by the interlock 33 thereof. Thus, all of the switches are protected and no switch may operate out of turn.

As the vibratory regulator 12 lowers the excitation of the synchronous condenser in accordance with the requirements of the power circuit, the exciter again approaches its limit of stable operation. As this condition is reached, the spring 41 will overcome the pull of the winding 36 of switch 28, completing the circuit through the interlock 39 and also opening the circuit through the switch arm 37. Upon the operation of switch 29, the excitation circuit for the condenser field-magnet winding extends through interlocks 33 and 39, switch arm 43 and resistor sections 24 and 23. Again the exciter is permitted to build up above the limit of stable operation thereof, but the effective voltage across the condenser field-magnet winding is lower, since there is now additional resistance in the excitation circuit.

The switches 29 and 30 will operate in a like manner to switch 28, each of switches 29 and 30 being respectively set to respond at lower voltages than the preceding switches. After switch 30 has operated, the excitation of the condenser field-magnet winding has been reduced to a predetermined minimum. As the requirements of the power circuit vary, requiring a higher excitation of the synchronous condenser, the switches 27 to 30, inclusive, will be operated in reverse order, so that the sections of the resistance will be progressively short-circuited. In this manner, the exciter is not required to build up excessively and, furthermore, rheostatic losses are materially minimized.

In the construction of the switch apparatus herein, it is necessary to arrange for the closing of the circuit through the interlocks prior to the opening of the circuit through the switch arms. There may be as many resistor sections and switches as desired. However, it is important that the amount of resistance inserted at one operation should not be so large as to cause the succeeding switch or switches to open after they have once closed. Also, in building up in the opposite direction, the closing of the successive relays must not cut out enough resistance so that the succeeding relay will not close, unless required by the conditions of the field-magnet winding.

While the present invention has been described above in connection with a system employing a synchronous condenser, it will be obvious that the same apparatus may be employed in connection with alternating-current generators to minimize the self-excitation thereof. With the present system, the electromagnetic switches 27 to 30, inclusive, will be connected in the field-magnet-winding circuit and they would operate in the manner above described to progressively insert and short-circuit the sections of the resistor in accordance with the requirements of the power system.

Modifications in the system and arrangement and location of parts may be made within the spirit and scope of our invention, and such modifications are intended to be covered by the appended claims.

We claim as our invention:—

1. In a regulator system, the combination with a dynamo-electric machine, an exciter therefor, and a regulator adapted to control the operation of said machine substantially within the range of stable operation of said exciter, of means whereby said regulator may accurately control the excitation of said machine beyond said range of stable operation of said exciter, said means comprising a plurality of resistor sections in circuit with said exciter, and a plurality of electroresponsive means for controlling the circuit to said sections.

2. In a regulator system, the combination with a power circuit, a dynamo-electric machine connected thereto and having a field winding, and an exciter therefor, an excitation circuit connecting said exciter to said winding, of regulator means controlled in accordance with a characteristic of said circuit, and means adapted to vary the resistance value of said excitation circuit, said means, comprising a plurality of impedance devices and a plurality of switches operated in accordance with the excitation voltage of said machine to connect said impedances in said excitation circuit.

3. In a regulator system, the combination with a power circuit, a dynamo-electric machine connected thereto, an excitation circuit and an exciter therefor, of regulator means controlled in accordance with a characteristic of said circuit, and means adapted to vary the resistance value of said excitation circuit, said means comprising a plurality of impedance devices and a plurality of electromagnetic switches respectively controlling said devices, each of said switches being adapted to control the circuit to the next succeeding switch.

4. In a regulator system, the combination with a dynamo-electric machine having a field winding, an exciter therefor and regulator means adapted to control the operation of said machine, of means for independently and progressively varying the operation of said machine, said means comprising a plurality of impedance devices, and electromagnetic means adapted to control said devices individually to reduce the voltage impressed on said field winding below the residual voltage of said exciter.

5. In a regulator system, the combination with a dynamo-electric machine, an exciter therefor and regulator means adapted to control the operation of said machine, of means for independently varying the operation of said machine, said means comprising a plurality of impedance devices and electro-magnetic switches for controlling said devices and each having a different operating value, said impedance devices being connected between said dynamo-electric machine and said exciter.

6. In a regulator system, the combination with a dynamo-electric machine, an exciter therefor and regulator means adapted to control the operation of said machine, of means for independently varying the operation of said machine, said means comprising a plurality of impedance devices, a master switch and a plurality of electromagnetic switches for controlling said devices.

7. In a regulator system, the combination with a dynamo-electric machine, an exciter therefor and regulator means adapted to control the operation of said machine, of means for independently varying the operation of said machine, said means comprising a plurality of impedance devices, and electromagnetic switches for controlling said devices, each having a different operating value, and each governing the circuit to the succeeding relay.

8. In a regulator system, the combination with a dynamo-electric machine, an exciter therefor, and regulator means adapted to control the operation of said machine, of means for independently varying the operation of said machine, said means comprising a plurality of resistor sections, and a plurality of electromagnetic switches respectively controlling said sections, each switch comprising an energizing winding, a switch member and an interlock controlled thereby and a spring for operating said switch member in one direction.

In testimony whereof, we have hereunto subscribed our names this 17th day of April, 1922.

HOLLIS K. SELS.
THEODORE SIMMONS.